Nov. 9, 1954  W. H. MOORE  2,693,782
CAN INSIDE SEAM STRIPING MACHINE
Filed Jan. 4, 1952  8 Sheets-Sheet 1

INVENTOR
WILLIAM H. MOORE
BY Cushman, Darby & Cushman
ATTORNEY

Nov. 9, 1954 W. H. MOORE 2,693,782
CAN INSIDE SEAM STRIPING MACHINE
Filed Jan. 4, 1952 8 Sheets-Sheet 3

INVENTOR
WILLIAM H. MOORE

BY *Cushman, Darby & Cushman*
ATTORNEY

United States Patent Office 2,693,782
Patented Nov. 9, 1954

2,693,782

CAN INSIDE SEAM STRIPING MACHINE

William H. Moore, Oreland, Pa., assignor, by mesne assignments, to Crown Cork & Seal Company, Inc., Baltimore, Md., a corporation of New York Application January 4, 1952, Serial No. 264,941

7 Claims. (Cl. 118—2)

The present invention relates to a machine for striping the inside seam of a can body. After the inside seam of a can body has been soldered it is necessary to spray paint, lacquer or a similar liquid over the seam to give coverage to the solder or exposed tin of the can body. Usually it is only necessary to stripe the seam of a can body, as the blank is coated or lined prior to the forming and seaming operations.

An object of this invention is the provision of a striping unit located at the end of a soldering attachment of the conventional type of can body seaming machine. By having the striping machine located at the end of the soldering attachment and prior to the take-off conveyor, the cans will be in the same uniform position in the horse or horn when they pass the spray nozzle of the striping machine.

Another object of the invention is the provision of a tube or cartridge type reservoir located within the horse or horn and having a smaller diameter than the can body to be sprayed. In the prior art, the spraying of the inside seam of can bodies necessitated a spray gun being located at the end of the solder attachment and having its connections for air and liquid supply tubes extending back through the solder horse or body maker horn to a source of supply of air and liquid. These tubes for conveying compressed air and liquid had to be surrounded by another tube through which cooling water was circulated to prevent the paint or lacquer from being affected by the heat from the pre-heating burner, solder roll and post burner. The provision of a tube or cartridge type reservoir located within the horse eliminates the necessity of circulating cooling water over the long supply lines.

A still further object of the invention is the provision of means for supplying compressed air to the spray nozzle without the necessity of having a supply tube carried back through the solder horse and body maker horn. The compressed air is injected into the spray nozzle body by making it jump an air gap from an air jet located adjacent to the spray nozzle. The provision for supplying compressed air to the spray nozzle eliminates the use of mechanical linkage arrangements for cutting off and on the supply of compressed air, as the can body will pass across the air gap and thus control the supply of air to the spray nozzle.

A still further object of this invention is the provision of an inside can body seaming striper located away from the can seam soldering attachment so that there is less likelihood of damage caused by cans jamming in the soldering attachment horse. Another advantage in having the striper unit located away from the soldering attachment is that the can bodies are allowed to cool sufficiently to prevent blistering of the paint or lacquer. Moreover, the can bodies will still be hot enough to cure or set the paint or lacquer.

These and other objects of the invention will appear more clearly from the accompanying drawings, in which.

In the preferred arrangement of the invention, as shown in the drawings, the can body inside seam striping or spraying machine consists of a frame 10 having a pair of complemental side bars which form a horse or horn 12 mounted thereon. The frame 10 and the horn 12 may be a part of a can body seaming machine or they may be separate. Prior to reaching the striping machine, the can bodies are made on a conventional type of body maker and are formed in a round shape. The side seam is then locked and bumped over a horn, after which the can body is conveyed through a horse over a pre-heating flame. After the seam has been heated and the can body passed over a solder roll, further heating is necessary to melt the solder and unite the seam. The can body proceeds past a revolving buffer or brush to remove excess solder and then it is cooled to a point below the melting point of solder. After these operations are performed, the can body is then conveyed on the guide or horn 12 carried by the frame 10 to the striping machine. The can body will then be conveyed over a spray nozzle 14 and the inside seam will be sprayed with lacquer, paint or some other similar liquid. The can body is then taken off of the inside seaming machine and carried to a machine for seaming ends on can bodies.

Referring specifically to the drawings, wherein like characters or reference numerals represent like or similar parts, the can body inside seam striper or sprayer consists of a frame 10 having a horse, horn or guide member 12 mounted thereon, by means of clamp assemblies 7 or the like. The can bodies 18 travel through the horse during the spraying operation. The horn 12 consists of two complemental side bars 13 having diametrically opposite concaved surfaces 16. The concaved surfaces 16 will support the can body 18 and hold it in a round shape without allowing the soldered seam 52 to be disturbed or the soldered joint fractured until the solder has solidified. The horn 12 may be an extension of the horn on a conventional type of can body seaming machine which supports the can body during the seaming operations or part of a separate machine.

The can bodies 18 are conveyed from the seaming machine by means of the endless chain link conveyor 20 having dogs or lugs 22 extending therefrom. When the can bodies 18 reach the in-feed station 19 of the can striping machine, an additional endless conveyor 24 having dogs or lugs 26 extending therefrom, will also engage the can body in order to give it additional support when advancing it through the machine. As best shown in Figs. 2, and 5 to 8, the conveyors 20 and 24 travel in a horizontal plane along the longitudinal length of the horn 12 and within the longitudinal grooves 28 and 29 of each section or side bar of the horn. After the can bodies 18 reach the discharge station 21, they are removed from the machine by means of the take-off conveyor 23 having lugs or dogs 25 extending therefrom which engage the can body and convey it to the next machine for the next operation in making a can.

Figure 7:
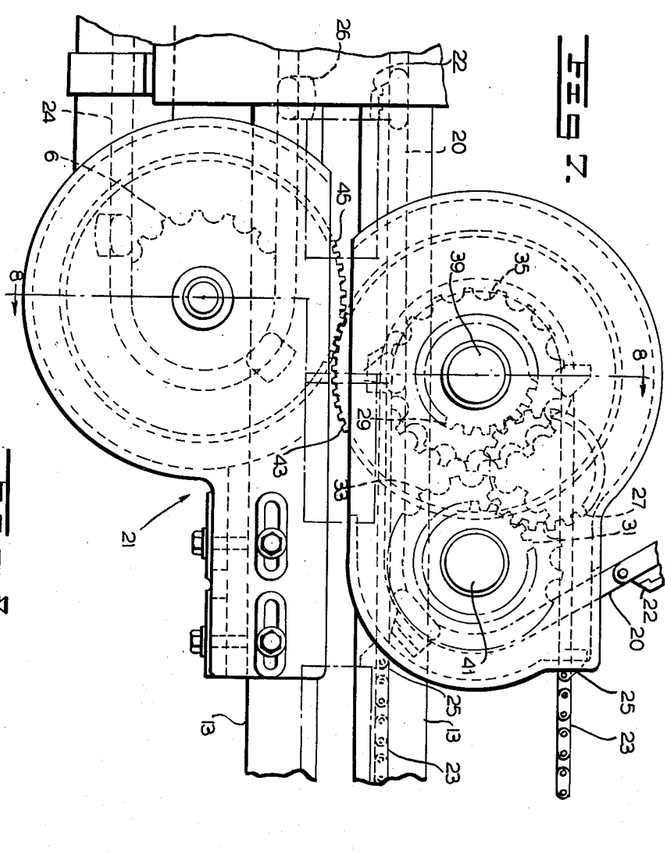
Figure 7 is an enlarged sectional plan view of the can body conveyors and the take-off conveyor at the discharge station.
Figure 8:
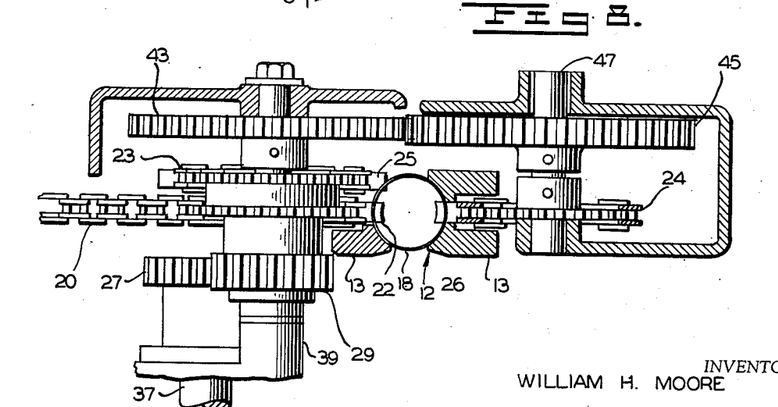
Figure 8 is a sectional view taken on the line 8—8 of Figure 7.

Figures 7 and 8 show clearly the drive for the conveyors 20, 23 and 24 at the discharge station 21. The drive gear 27 mounted on the drive shaft 37 is continuously driven by a suitable source of power (not shown). The gear 27 meshes with the gears 29 and 31 which are mounted on the shafts 39 and 41 respectively. The sprocket wheel 33 mounted on the shaft 41 will drive the conveyor 20 while the sprocket wheel 35 mounted on the shaft 39 will drive the take-off conveyor 23. Also mounted on the shaft 39 is the gear 43 which meshes with the gear 45 mounted on the shaft 47 that carries the drive sprocket 6 for the conveyor 24. It is obvious that one source of power is utilized in one compact housing to operate the conveyors 20, 23 and 24 in timed relationship.

Figure 1:
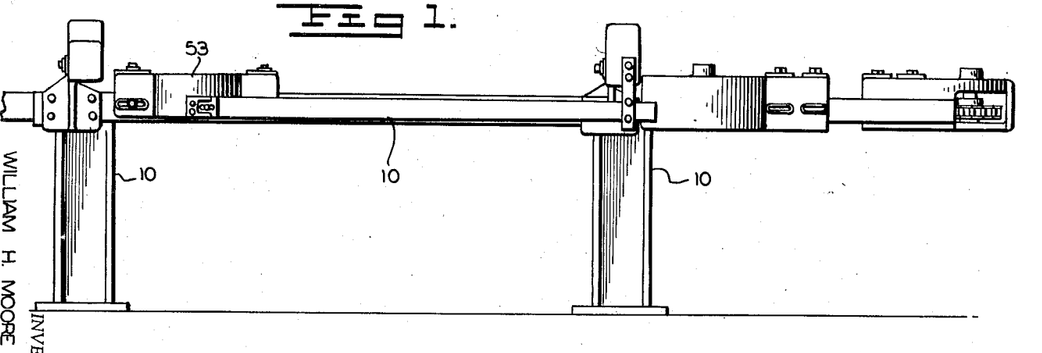
Figure 1 is a front elevational view of the can body inside seam striping machine.
Figure 2:
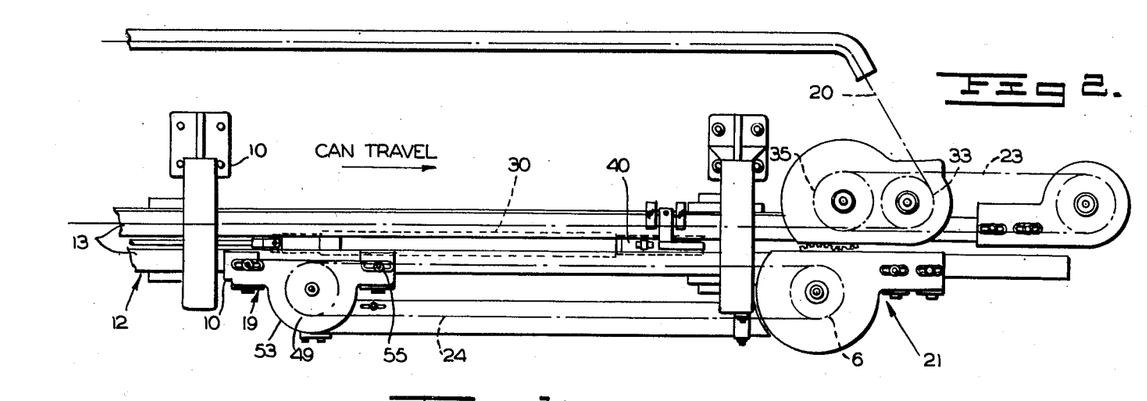
Figure 2 is a plan view of Figure 1.
Figures 3, 4:
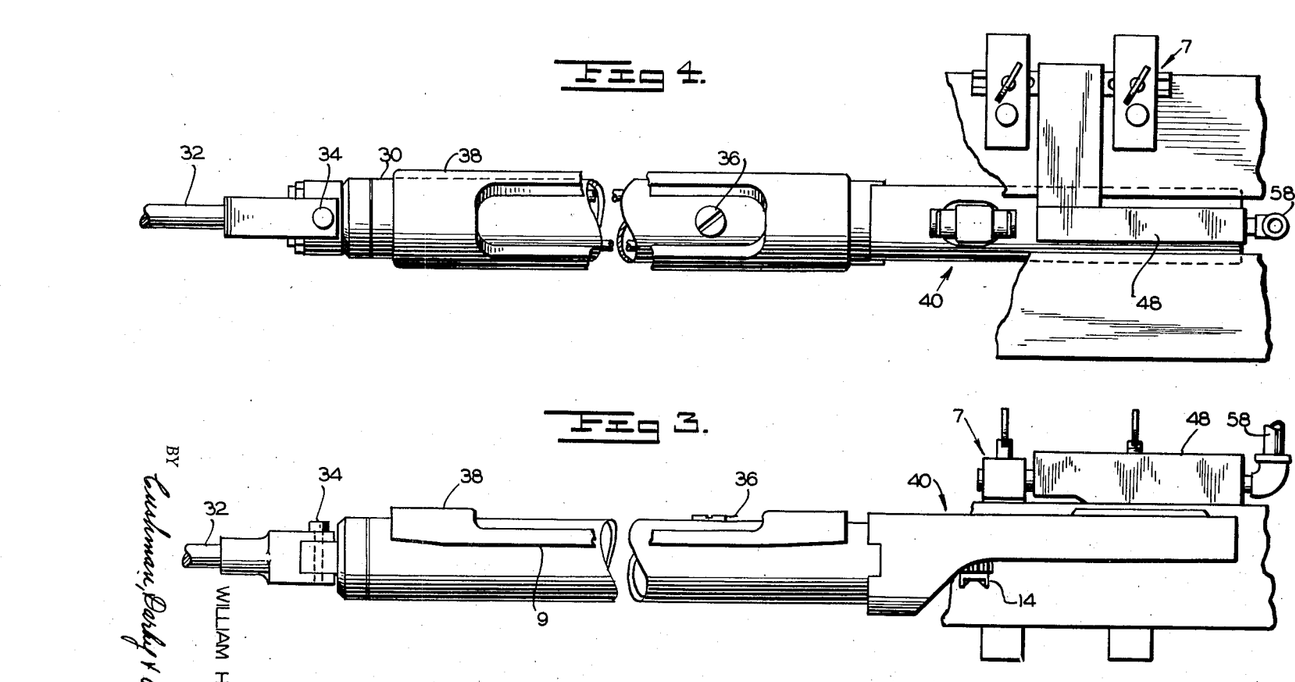
Figure 3 is an enlarged elevational view of the liquid tube reservoir and the spray nozzle assembly.
Figure 4 is a plan view of Figure 2.
Figure 5:
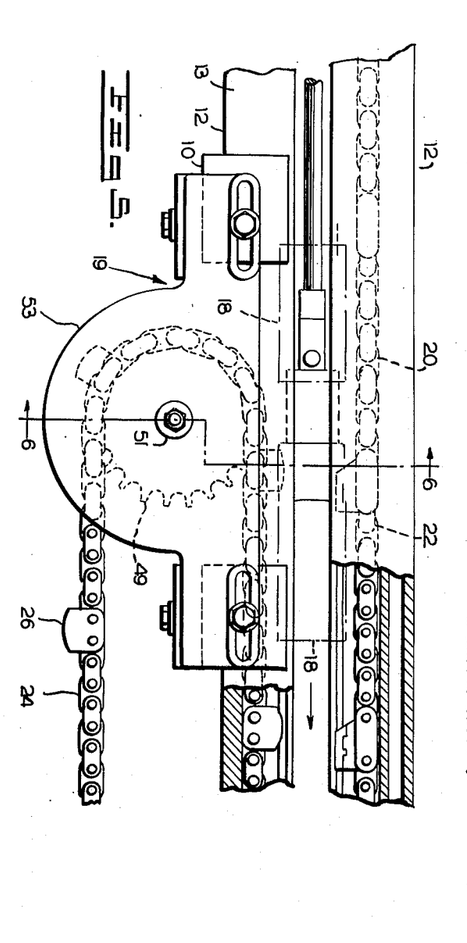
Figure 5 is an enlarged sectional plan view of the can body conveyors at the infeed station.
Figure 6:
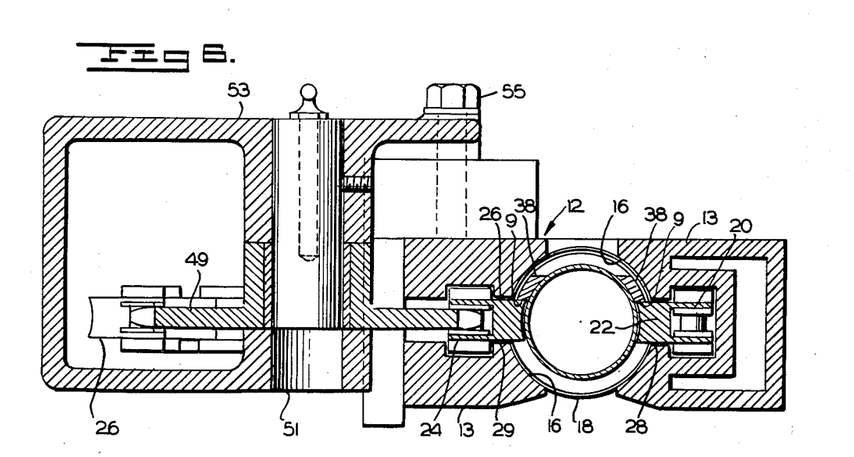
Figure 6 is a sectional view taken on the line 6—6 of Figure 5.

Figures 5 and 6 disclose the intake station 19 wherein the conveyor 24 aids the conveyor 20 to advance the can bodies 18 through the machine. The conveyor 24 passes around the sprocket 49 mounted on the shaft 51 carried by the housing 53. The tension of the conveyor 24 may be adjusted by moving the housing 53 which is bolted to the frame 10 by the adjustment bolts 55.

A cylindrical cartridge or closed tube type of reservoir 30 which holds a supply of paint or lacquer is located at the end of the horn 12 between its two half sections or side bars 13. This provision allows the can bodies 18 to be sufficiently cool when the paint or lacquer is applied and thus there will be no blistering. However, the can is still sufficiently hot to cure the paint or lacquer. An arcuate shaped member 38 is welded to the top portion of the reservoir 30. The member 38 has a horizontal longitudinal surface or shoulder 9 which rests on the lugs 22 and 26 of the conveyors 20 and 24 respectively to support the reservoir 30 centrally of the side bars 13 of the horn 12. By this means of support, the reservoir 30 will not rub or scrape the inside surface of can bodies as they are conveyed through the horn because the reservoir is freely supported centrally of the horn at all times. The supporting member 38 has an elliptical shaped cut out so that a plug 36 may be inserted in the reservoir 30. The plug 36 may be removed when it is desired to replenish the supply of liquid in the reservoir. In addition to the support, by means of the lugs 24 and 26 on the surface 9 of the member 38, the reservoir 30 is held in position lengthwise in the horn 12 by means of a pipe 32 extending from and connected to the body maker horn (not shown) back to the end of the tube reservoir 30. A bolt or pin 34 connects the pipe 32 to the reservoir and when the reservoir is to be replaced, it is merely necessary to remove the pin 34 and unclamp the side bars 13 of the horn 12.

Referring specifically to Figures 9 through 13, a nozzle body assembly 40 is attached to the other end of the reservoir 30. The nozzle body assembly 40 has a spray nozzle 14 mounted therein of the type wherein compressed air is supplied to the nozzle to siphon and atomize the liquid in the reservoir. The spray nozzle 14 is frictionally held in the nozzle body assembly 40 by means of the rubber gaskets 50. Thus, the spray nozzle 14 may be easily removed from the machine for cleaning or replacement purposes. The nozzle body assembly 40 is provided with a conduit 42 leading from the reservoir 30 at a level below the liquid therein to the spray nozzle 14. In addition, the assembly 40 is provided with a conduit or manifold 44 for introducing compressed air into the spray nozzle 14. The conduit or manifold 44 has a plurality of ports 46 which are located adjacent to the air jet assembly 48 mounted on the frame 10. The air jet assembly 48 has a common manifold 54 with a plurality of ports 56 depending therefrom. Ports 56 will cooperate to supply compressed air to the ports 46 of the nozzle body assembly 40. It will be noted that there is a gap of sufficient distance to allow a can body 18 to pass between the nozzle assembly 40 and the air jet assembly 48. The purpose of this air gap 60 will be explained in more detail later in the specification.

Figure 9:
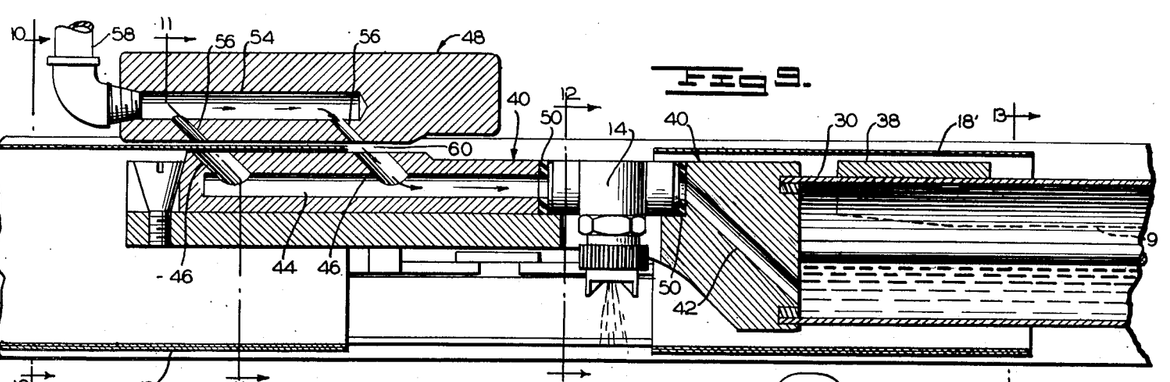
Figure 9 is a fragmental cross-sectional view of the air jet, spray nozzle, and liquid reservoir.
Figure 10:
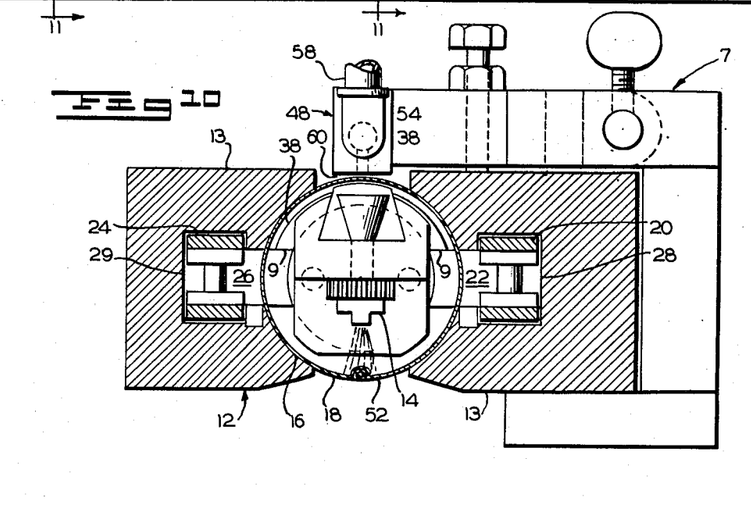
Figure 10 is a sectional view taken on the line 10—10 of Figure 9.
Figure 11:
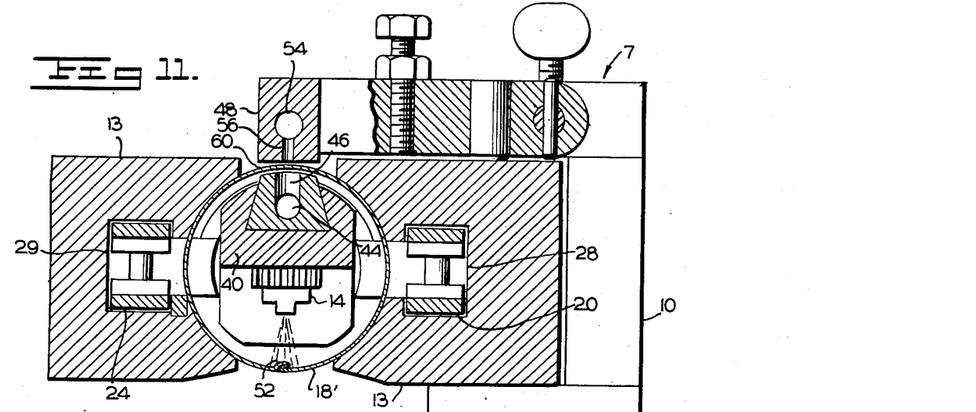
Figure 11 is a sectional view taken on the line 11—11 of Figure 9.
Figure 12:
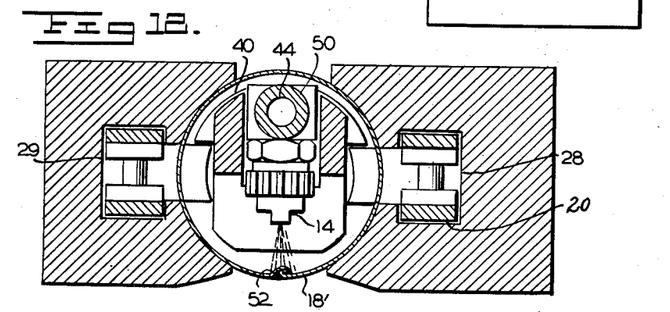
Figure 12 is a sectional view taken on the line 12—12 of Figure 9.
Figure 13:
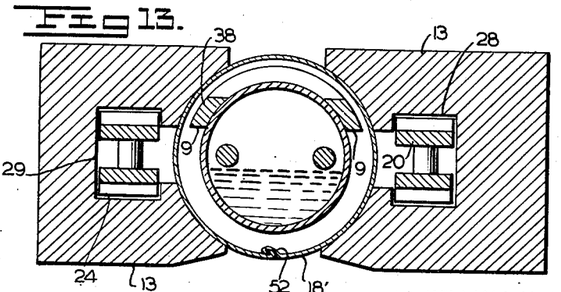
Figure 13 is a sectional view taken on the line 13—13 of Figure 9.

As shown in Figure 9, the can body 18' is about to have its inside seam 52 sprayed with a paint or lacquer. The spray nozzle is just beginning to spray the liquid. The reason for this is that the preceding can body 18 which is spaced from the can body 18' has uncovered one of the ports 46 and one of the ports 56, allowing compressed air to flow through the tube 58, manifold 54, conduit 44 and spray nozzle 14. Since the can bodies are in spaced relationship to one another as they are conveyed on the horn 12, they will subsequently cut off and on the spray nozzle 14, depending on whether or not they are in the air gap 50 between the air jet assembly 48 and the nozzle body assembly 40. The dogs 22 and 25 of the conveyors 20 and 24 respectively are in a spaced relation so that they carry the can bodies at such a distance apart that the preceding can body will be in a position to cut off the air jumping the air gap 50 when no can body is adjacent to the spray nozzle 14. After the ports 46 and 56 are uncovered as the can body is moved forward on the conveyor the subsequent can body will be in position to have its inside seam 52 sprayed with a coating liquid. It is obvious that this type of control system for the spray nozzle will reduce the amount of paint wasted from over-spraying the ends of the can bodies.

Figures 14, 15:
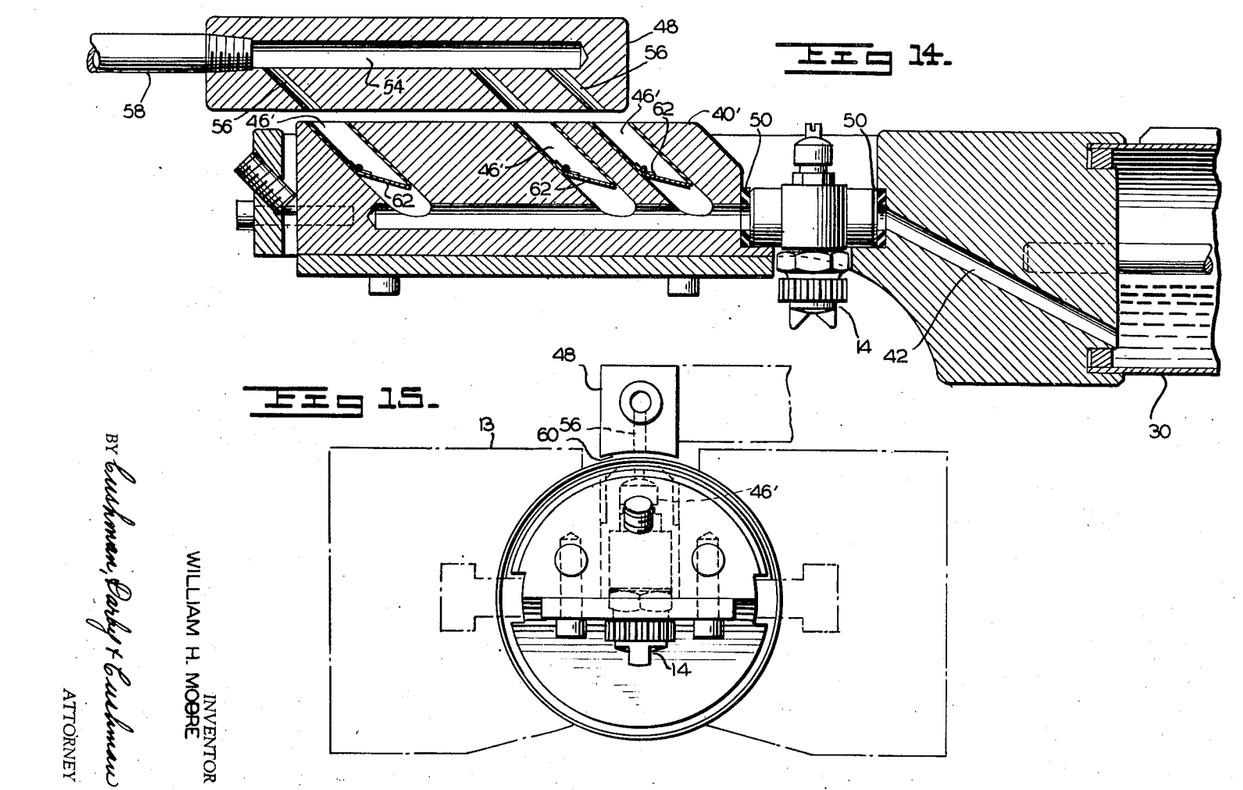
Figure 14 is an enlarged fragmental cross-sectional view of a modified form of the spray nozzle assembly.
Figure 15 is a front elevational view of Figure 14.

Figures 14 and 15 show a modified form of nozzle body assembly wherein a check valve is provided to prevent the loss of compressed air when several of the ports are uncovered. The nozzle body assembly 40' is substantially equivalent to the nozzle body assembly 40 previously described. However, this assembly is used when the distance between can bodies is less than a can body length. Consequently, a plurality of ports 46' must be provided with a plurality of one-way check valves 60. When a can body 18 is passing over the ports 46' the compressed air would be lost out of the ports which are uncovered as the can body passes further along the conveyor. The one-way check valves 62 have a pivoted member that will close the port from compressed air trying to back track through the port and this will prevent this undesirable loss of compressed air.

Figure 16:
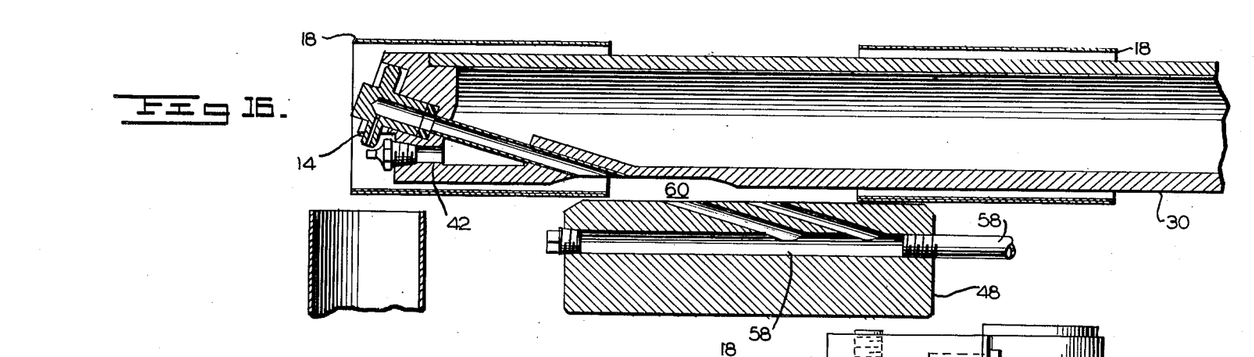
Figure 16 is an enlarged fragmental cross-sectional view of another modified form of spray nozzle assembly.
Figure 17:
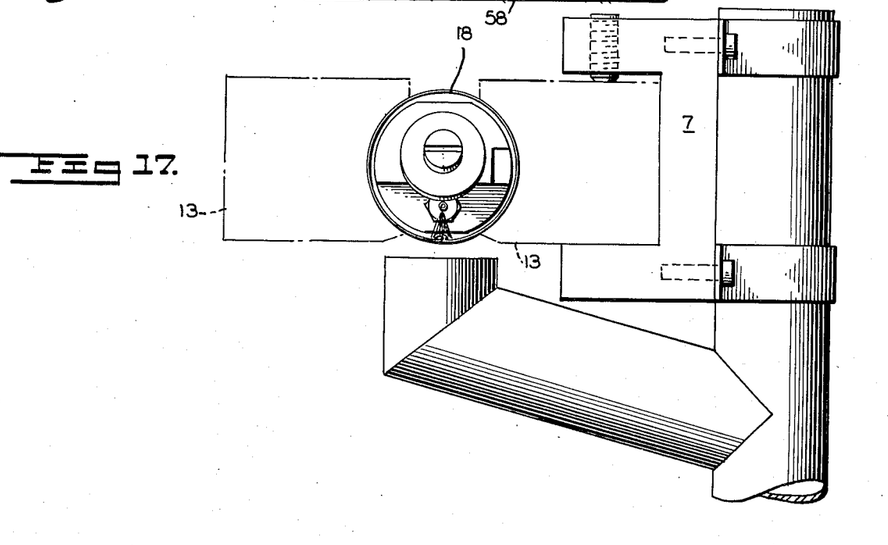
Figure 17 is a front elevational view of Figure 16.

Figures 16 and 17 show another modification of the nozzle body assembly 40. In this modification the air jet assembly 48 is located in front of the spray nozzle 14 and adjacent to the reservoir 30. It is also noted that the air jet assembly 48 which is attached to the frame 10 is located beneath the reservoir rather than above the reservoir. In this embodiment of the invention the can body 18 which is trailing will control the spraying of the seam of the immediately preceding can body. As in the other embodiments of the nozzle body assembly, the can body will pass between the air jet and the nozzle body assembly to cut off the supply of compressed air to the nozzle 14.

The terminology used in this specification is for the purpose of description and not for limitation, as the scope of the invention is defined in the claims.

I claim:

1. A machine for striping the inside seam of can bodies conveyed therethrough comprising in combination, a frame, a horn carried by said frame and forming a guideway by which can bodies may be advanced one by one through said machine, a conveyor for advancing the can bodies through said machine, said conveyor having means thereon for spacing and maintaining the space between the can bodies, means mounted within said horn for striping the inside seam of each of said can bodies, said means including a freely suspended cylindrical liquid reservoir of smaller diameter than said can bodies, a spray nozzle mounted on one end of said reservoir, and means mounted adjacent to and communicating with said nozzle for introducing compressed air to said nozzle for siphoning the liquid from said reservoir.

2. A machine for striping the inside seam of can bodies conveyed therethrough comprising in combination, a frame, a horn carried by said frame and forming a guideway by which can bodies may be advanced one by one through said machine, a conveyor for advancing the can bodies through said machine, said conveyor having means thereon for spacing and maintaining the space between can bodies, means mounted within said horn for striping the inside seam of each of said can bodies, said means including a freely suspended cylindrical liquid reservoir of smaller diameter than said can bodies, a spray nozzle mounted on one end of said reservoir, means mounted adjacent to and communicating with said nozzle for introducing compressed air to said nozzle for siphoning the liquid from said reservoir, said means being intermittently operated by a can body and including an air jet member mounted on said frame externally of said horn, a member connected to said nozzle and having a conduit therein leading from said spray nozzle and terminating adjacent to said air jet member at a sufficient distance therefrom to allow a can body to pass therebetween to cut off said compressed air supply, the end of the conduit of said member terminating adjacent said air jet member being of sufficient distance from said air nozzle so that the space between can bodies will be adjacent said nozzle when a can body is adjacent said air jet member.

3. A machine for striping the inside seam of can bodies conveyed therethrough comprising in combination, a frame, a horn carried by said frame and forming a guideway by which can bodies may be advanced one by one through said machine, a pair of complemental endless conveyors mounted in a horizontal plane and having spaced lugs for engaging and conveying can bodies through the machine in spaced relationship to each other, a cylindrical liquid reservoir of smaller diameter than said can bodies carried within said horn, means for freely suspending said reservoir, said means including a supporting member attached to said reservoir and having horizontal shoulders resting on said lugs of said conveyors, a spray nozzle mounted on one end of said reservoir, means mounted adjacent to and communicating with said nozzle for introducing compressed air to said nozzle for siphoning the liquid from said reservoir.

4. A machine for striping the inside seam of can bodies conveyed therethrough comprising in combination, a frame, a horn carried by said frame and forming a guideway by which can bodies may be advanced one by one through said machine, a pair of complemental endless conveyors mounted in a horizontal plane and having spaced lugs for engaging and conveying can bodies through the machine in spaced relationship with each other, a cylindrical liquid reservoir of smaller diameter than said can bodies carried within said horn, means for freely suspending said reservoir, said means including a supporting member attached to said reservoir and having horizontal shoulders resting on said lugs of said conveyors, a spray nozzle mounted on one end of said reservoir, means mounted adjacent to and communicating with said nozzle for introducing compressed air to said nozzle for siphoning the liquid from said reservoir, said means being intermittently operated by a can body and including an air jet member mounted on said frame externally of said horn, a member connected to said nozzle and having a conduit therein leading from said spray nozzle and terminating adjacent to said air jet member at a sufficient distance therefrom to allow a can body to pass therebetween to cut off said compressed air supply, the end of the conduit of said member terminating adjacent said air jet member being of sufficient distance from said air nozzle so that the space between can bodies will be adjacent said nozzle when a can body is adjacent said air jet member.

5. A machine for striping the inside seam of can bodies conveyed therethrough comprising, in combination, a frame, a horn carried by said frame and forming a guideway by which can bodies may be advanced one by one through said machine, said horn comprising spaced complemental side bars, a conveyor for advancing said can bodies through said machine, said conveyor having means thereon for spacing and maintaining the space of the can bodies, means for striping the inside seam of each of said can bodies passing through said machine, said striping means including a cylindrical liquid reservoir mounted between said side bars of said horn, a spray nozzle mounted on one end of said reservoir for striping the inside seam of said can bodies, and means mounted adjacent to and communicating with said nozzle for introducing compressed air to said nozzle for siphoning liquid from said reservoir, said means for introducing compressed air including an air jet member mounted on said frame externally of said horn and having a plurality of conduits therein, a plurality of conduits in said spray nozzle cooperating with the conduits of said air jet member, and an air gap between said conduits of said air jet member and said nozzle, said air gap being of a sufficient size to allow a can body to pass therebetween and cut off the supply of said compressed air, said air gap also being a sufficient distance from the outlet of said nozzle so that a space between can bodies will be adjacent said nozzle when a cam body is passing therethrough.

6. A machine for striping the inside seam of can bodies conveyed therethrough comprising, in combination, a frame, a horn carried by said frame and forming a guideway by which can bodies may be advanced one by one through said machine, said horn comprising spaced complemental side bars, a conveyor for advancing said can bodies through said machine, said conveyor having means thereon for spacing and maintaining the space between can bodies, means for striping the inside seam of each of said can bodies passing through said machine, said striping means including a cylindrical liquid reservoir mounted between said side bars of said horn, a spray nozzle mounted on one end of said reservoir for striping the inside seam of said can bodies, and means introducing compressed air to said nozzle for siphoning liquid from said reservoir, said means for introducing compressed air including an air jet member mounted on said frame adjacent to said nozzle, a plurality of conduits in said air jet member, a plurality of conduits in said spray nozzle for cooperating with the conduits in said air jet member and an air gap between said conduits of said air jet member and said nozzle, said air gap being of a sufficient size to allow a can body to pass therebetween and cut off the supply of said compressed air, said air gap also being a sufficient distance from the outlet of said nozzle so that a space between can bodies will be adjacent said nozzle when a can body is passing therethrough, means mounted within each of the conduits in said nozzle for preventing the loss of compressed air when at least one of said ports of said spray nozzle is closed by a passing can.

7. A machine for striping the inside seam of can bodies conveyed therethrough comprising, in combination, a frame, a horn carried by said frame and forming a guideway by which can bodies may be advanced one by one through said machine, said horn comprising spaced complemental side bars, a conveyor for advancing said can bodies through said machine, said conveyor having means thereon for spacing and maintaining the space between can bodies, means for striping the inside seam of each of said can bodies passing through said machine, said striping means including a cylindrical liquid reservoir mounted between said side bars of said horn, a spray nozzle mounted on one end of said reservoir for striping the inside seam of said can bodies, and means introducing compressed air to said nozzle for siphoning liquid from said reservoir, said means for introducing compressed air including an air jet member mounted on said frame adjacent to said nozzle, a plurality of conduits in said air jet member, a plurality of conduits in said spray nozzle for cooperating with the conduits in said air jet member, and an air gap between said conduits of said air jet member and said nozzle, said air gap being of a sufficient size to allow a can body to pass therebetween and cut off the supply of said compressed air, said air gap also being a sufficient distance from the outlet of said nozzle so that a space between can bodies will be adjacent said nozzle when a can body is passing therethrough, means for preventing the loss of compressed air when at least one of said conduits of said spray nozzle is closed by a passing can, said means for preventing the loss of compressed air consisting of a check valve mounted in each of said conduits of said spray nozzle.

References Cited in the file of this patent

UNITED STATES PATENTS

| Number | Name | Date |
|---|---|---|
| 2,220,107 | Holloway | Nov. 5, 1940 |
| 2,305,387 | Pearson | Dec. 15, 1942 |
| 2,420,620 | Remington et al. | May 13, 1947 |
| 2,576,942 | Jakob | Dec. 4, 1951 |